United States Patent
Karanth

(10) Patent No.: US 11,146,059 B2
(45) Date of Patent: Oct. 12, 2021

(54) CIRCUIT AND METHOD FOR MANAGING AN INRUSH CURRENT

(71) Applicant: Harman Becker Automotive Systems GmbH, Karlsbad (DE)

(72) Inventor: Avinash Sridhara Karanth, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 170 days.

(21) Appl. No.: 16/462,378

(22) PCT Filed: Oct. 27, 2017

(86) PCT No.: PCT/EP2017/077537
§ 371 (c)(1),
(2) Date: May 20, 2019

(87) PCT Pub. No.: WO2018/095692
PCT Pub. Date: May 31, 2018

(65) Prior Publication Data
US 2019/0280477 A1  Sep. 12, 2019

(30) Foreign Application Priority Data
Nov. 25, 2016  (EP) .................................... 16200617

(51) Int. Cl.
H02H 9/00 (2006.01)
H02H 1/00 (2006.01)
H02J 1/06 (2006.01)

(52) U.S. Cl.
CPC .......... *H02H 9/002* (2013.01); *H02H 1/0007* (2013.01); *H02J 1/06* (2013.01)

(58) Field of Classification Search
CPC .......... H02H 9/002; H02H 1/0007; H02J 1/06
See application file for complete search history.

(56) References Cited

U.S. PATENT DOCUMENTS 5,844,440 A    12/1998  Lenk et al.
7,019,583 B2 *  3/2006  Del Signore, II ..... H02H 9/001
                                             323/908
(Continued)

FOREIGN PATENT DOCUMENTS

CN    1930779 A    3/2007
CN    103441482 A   12/2013
(Continued)

OTHER PUBLICATIONS

International Search Report dated Jan. 24, 2018, PCT/EP2017/077537 filed Oct. 27, 2017, 11 pgs.
(Continued)

*Primary Examiner* — Kyle J Moody
*Assistant Examiner* — Jye-June Lee
(74) *Attorney, Agent, or Firm* — Brooks Kushman P.C.

(57) ABSTRACT

A circuit is provided for managing an inrush current of a load. The load is coupled between a voltage source and a terminal for a negative supply potential. The circuit includes a switch that is coupled between the voltage source and the load, and that is configured to connect the load to or disconnect the load from the voltage source. The circuit further includes at least one load capacitor coupled in parallel to the load between the switch and the terminal for negative supply potential. The circuit further includes a control unit. The control unit has a sense unit and a switching unit. The sense unit is configured to determine the inrush current when the switch is closed to connect the load to the voltage source, and the switching unit is configured to control the switching of the switch depending on the inrush current.

14 Claims, 5 Drawing Sheets

(56) References Cited

U.S. PATENT DOCUMENTS

2002/0015272 A1    2/2002  Hattori
2002/0176216 A1   11/2002  Del Signore, II et al.
2012/0063045 A1*   3/2012  Shearon .................. H02H 3/08
                                                        361/65

FOREIGN PATENT DOCUMENTS

| CN | 204668906 U | 9/2015 |
| CN | 105703754 A | 6/2016 |
| WO | 02061909 A2 | 8/2002 |

OTHER PUBLICATIONS

Chinese Office Action for Application No. 201780072839.8 filed May 24, 2019, dated Dec. 29, 2020, 8 pgs.

* cited by examiner

CIRCUIT AND METHOD FOR MANAGING
AN INRUSH CURRENT

CROSS-REFERENCE TO RELATED
APPLICATIONS

This application is the U.S. national phase of PCT Application No. PCT/EP2017/077537 filed on Oct. 27, 2017, which claims priority to EP Patent Application No. 16 200 617.5 filed on Nov. 25, 2016, the disclosures of which are incorporated in their entirety by reference herein.

TECHNICAL FIELD

The disclosure relates to a circuit and a method for managing an inrush current, in particular for controlling an inrush current in load switch applications.

BACKGROUND

In order to reduce the quiescent current consumption of a load, switches may be used that disconnect the load from the power supply while an operation of the load is not required. Furthermore, in many systems, capacitors are coupled in parallel to the load to ensure that there are no voltage drops on the supply rails of the load. Some systems include both, a switch for disconnecting the load from the power supply and at least one such capacitor in parallel to the load. When such a system is reactivated by closing the switch in order to apply power to the load, the capacitors will be charged which may result in an inrush current that can exceed the nominal current of the load. Excessive inrush currents, however, can cause damage to the system.

SUMMARY

A circuit is provided for managing an inrush current of a load. The load is coupled between a voltage source and a terminal for a negative supply potential. The circuit includes a switch that is coupled between the voltage source and the load, and that is configured to connect the load to or disconnect the load from the voltage source. The circuit further includes at least one load capacitor coupled in parallel to the load between the switch and the terminal for negative supply potential. The circuit further includes a control unit. The control unit includes a sense unit and a switching unit, wherein the sense unit is configured to determine the inrush current when the switch is closed to connect the load to the voltage source, and the switching unit is configured to control the switching of the switch depending on the inrush current.

A method is provided for managing an inrush current of a load. The load is coupled between a voltage source and a terminal for a negative supply potential. The method comprises providing a switching signal to a switch, wherein the switch is coupled between the voltage source and the load and wherein the switch is configured to connect the load to or disconnect the load from the voltage source, determining an inrush current through the switch, and adjusting the switching signal depending on the determined inrush current.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The method may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
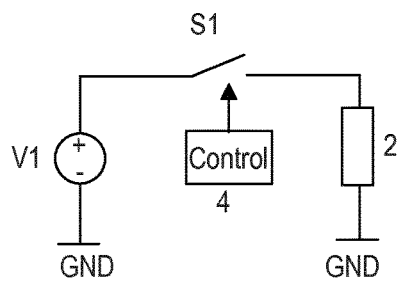
FIG. 1 is a schematic diagram of a circuit including a load switch for disconnecting a load.

FIG. 1 illustrates a circuit including a load 2. The load 2 is coupled between a voltage source V1 and a terminal for a negative supply potential GND. A switch S1 is coupled between the load 2 and the voltage source V1 and is configured to connect the load 2 to or disconnect the load 2 from the voltage source V1. A control unit 4 is configured to control the switch S1. The control unit 4, for example, may provide a control signal to the switch S1. Depending on the control signal, the switch S1 may be opened or closed. In one example, the switch S1 may be closed if the control signal has a high level and may be open if the control signal has a low level, or vice versa. This is, however, only an example. In another example, the switch S1 may be closed when the control signal is above a threshold level and may be opened when the control signal is below the threshold level, or vice versa. The switch S1 may be opened during time periods, during which an operation of the load 2 is not required. The circuit may be in a standby-mode, for example, when the switch S1 is open. The circuit may be in an active mode, for example, when the switch S1 is closed. Especially in circuits including battery powered loads, such load switches S1 are often used to extend battery lifetime. While connected to the battery, the load 2 usually consumes at least a small amount of power, even if the load 2 is inactive. The use of load switches can significantly reduce quiescent current.

Figure 2:
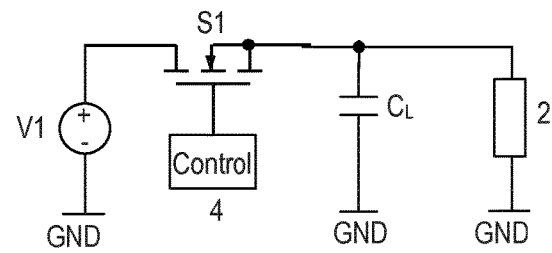
FIG. 2 is a schematic diagram of another circuit including a load switch for disconnecting a load.

The circuit illustrated in FIG. 2 is similar to the circuit that has been described with regard to FIG. 1. The switch S1 in the example of FIG. 2, however, is implemented as a MOSFET (Metal Semiconductor Field-Effect Transistor). The MOSFET may be a P-channel or N-channel MOSFET that passes the voltage to the load 2, when the transistor is in an on-state. This is, however, only an example. A load switch S1 may be implemented in any other suitable way. In the circuit in FIG. 2, a load capacitor $C_L$ is coupled in parallel to the load 2 between the switch S1 and the terminal for negative supply potential GND. The capacitor $C_L$ is configured to ensure that there are no voltage drops on the supply rails. However, when power is initially applied to the system, e.g., when the switch S1 is closed to activate the load 2, this capacitor $C_L$ charges. The charging of the capacitor $C_L$ can result in an inrush current. This inrush current may be in the order of up to 100 A and more. Thus, the inrush current may exceed the nominal load current. The nominal load current in this context is the maximum amount of electric current the load 2 can carry before sustaining immediate damage or deterioration.

Upon system startup (e.g., when the switch S1 is closed), the power supply V1 will ramp up to the regulated voltage. As the voltage increases, the inrush current flows into the uncharged capacitor $C_L$. The amount of inrush current into the capacitor $C_L$ is determined by the slope of the voltage ramp described as follows:

$$i_C = C_L \frac{dV}{dt} \quad (1)$$

Wherein $i_C$ is the amount of inrush current caused by the capacitance, $C_L$ is the capacitance of the capacitor, dV is the change in voltage during ramp up and dt is the rise time during voltage ramp up.

When the inrush current is managed or controlled, the charging of the capacitor $C_L$ becomes slower. Generally, an inrush current can be reduced by increasing the voltage rise time of the capacitor $C_L$ and thereby slowing down the rate at which the capacitor $C_L$ charges. If the voltage increases linearly, the charging current (inrush current $i_C$) remains constant.

Figure 3:
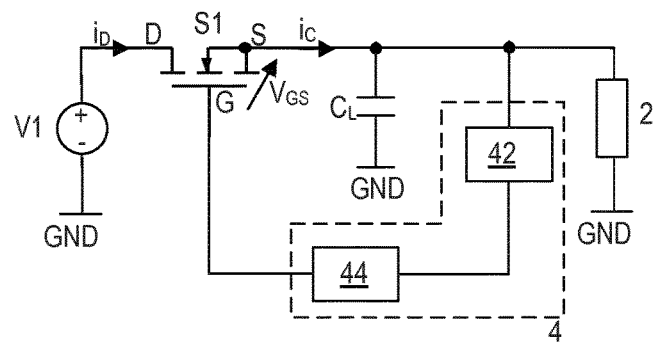
FIG. 3 illustrates a schematic diagram of a circuit for managing an inrush current.

FIG. 3 illustrates an example of a circuit for managing the inrush current. The circuit generally corresponds to the circuit of FIG. 2, however the control unit 4 in the circuit of FIG. 3 includes a sense unit 42 and a switching unit 44. The control unit 4 is coupled to a common node between the switch S1 and the load 2 with a first input. At its output the control unit 4 provides a switching signal to the switch S1, the switching signal being configured to switch the switch S1 on or off (switch closed or open). The sense unit 42 and the switching unit 44 are coupled in series between the input and the output of the control unit 4. The sense unit 42 is configured to determine the inrush current $i_C$. The switching unit 44 is configured to control the switch S1 depending on the inrush current $i_C$ measured by the sense unit 42. In particular, the switching unit 44 may control the turning on of the switch S1. The switch S1 may be implemented as a MOSFET, for example. In the circuit of FIG. 3 the MOSFET is illustrated as an enhancement-type MOSFET. A MOSFET generally is a voltage controlled field effect transistor. A MOSFET of the enhancement-type conducts virtually no current ($I_D$=0), when the gate-source voltage $V_{GS}$ of the MOSFET is zero. When the gate-source voltage $V_{GS}$ reaches a threshold voltage, a drain current $I_D$ starts flowing through the MOSFET ($I_D$>0). The amount of current that flows through the MOSFET is dependent on the gate-source voltage $V_{GS}$. Therefore, the drain current $I_D$ and thus the resulting inrush current $I_C$ may be controlled by controlling the gate-source voltage $V_{GS}$. The switching unit 44 may be configured to control this gate-source voltage $V_{GS}$. For example, the MOSFET may be operated in its so-called linear region during turn-on. In this linear region the drain-source channel (D-S) of the MOSFET is conducting and is controlled by the gate-source voltage $V_{GS}$. For the MOSFET to be in the linear state the gate-source voltage $V_{GS}$ has to be in the range of the so-called Miller voltage.

The MOSFET may be operated in its linear region until the capacitor $C_L$ is fully charged. Operating the MOSFET in its linear region, thereby providing a constant charging current to the capacitor $C_L$, increases the time that is needed to fully charge the capacitor $C_L$.

Figure 4:
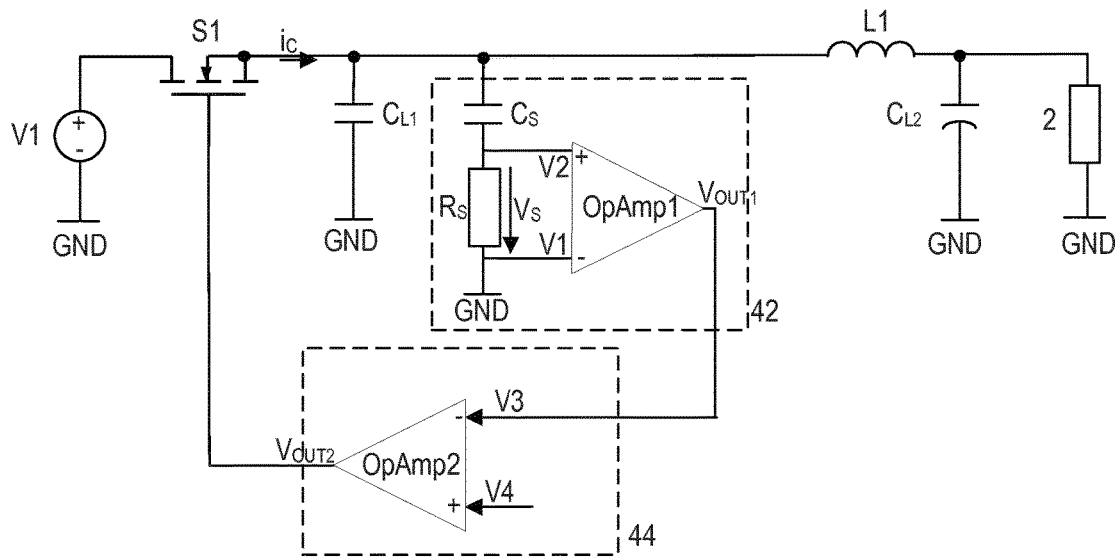
FIG. 4 illustrates a schematic diagram of another circuit for managing an inrush current.

FIG. 4 illustrates another circuit for managing the inrush current. In the circuit of FIG. 4, a first capacitor $C_{L1}$ is coupled between the switch S1 and the terminal for negative supply potential GND. An inductance L1 is coupled between the load 2 and a common node between the switch S1 and the first capacitor $C_{L1}$. A second capacitor $C_{L2}$ is coupled in parallel to the load 2 between the inductance L1 and the terminal for negative supply potential GND. The inductance L1 and the second capacitor $C_{L2}$ form an LC circuit (resonant circuit). The second capacitor $C_{L2}$ may be an electrolytic capacitor, for example. The use of two load capacitors $C_{L1}$, $C_{L2}$ is only an example. Any other number of load capacitors $C_{L1}$, $C_{L2}$ may be used in the circuit, depending on the application.

The sense unit 42 includes a sense capacitor $C_S$ and a sense resistor $R_S$ that are coupled in series. The series connection including the sense capacitor $C_S$ and the sense resistor $R_S$ is coupled in parallel to the first capacitor $C_{L1}$ between the switch S1 and the terminal for negative supply potential GND. The sense unit 42 further includes a first operational amplifier OpAmp1. With a first input V1, the operational amplifier OpAmp1 is coupled to the common node between the sense resistor $R_S$ and the terminal for negative supply potential GND. With a second input V2, the operational amplifier OpAmp1 is coupled to a common node between the sense capacitor $C_S$ and the sense resistor $R_S$. The operational amplifier OpAmp1 is configured to determine a sense current through the sense resistor $R_S$. At its output $V_{OUT1}$, the operational amplifier OpAmp1 provides a sense voltage that is dependent on the sense current through the sense resistor $R_S$ and, therefore, also on the inrush current $i_C$.

The switching unit 44 includes a second operational amplifier OpAmp2. At a first input V3, the second operational amplifier OpAmp2 receives the sense voltage from the first operational amplifier OpAmp1. At a second input V4, the second operational amplifier OpAmp2 receives a reference voltage. The second operational amplifier OpAmp2 is configured to provide a switching voltage at its output $V_{OUT2}$ that is provided to the gate G of the MOSFET. The switching voltage depends on the difference between the sense voltage and the reference voltage. When the sense voltage is lower than the reference voltage, a switching voltage will be provided to the gate G of the MOSFET. Once the gate-source voltage $V_{GS}$ is greater than the threshold voltage of the MOSFET, the MOSFET conducts a current, as has been explained above. As a result, the gate-source voltage $V_{GS}$ decreases when the inrush current $i_C$ increases, and vice versa. When the gate-source voltage $V_{GS}$ decreases, this will also result in a decrease of the inrush current $i_C$. In this way the inrush current $i_C$ can be controlled to not exceed a predetermined value.

Figure 5:
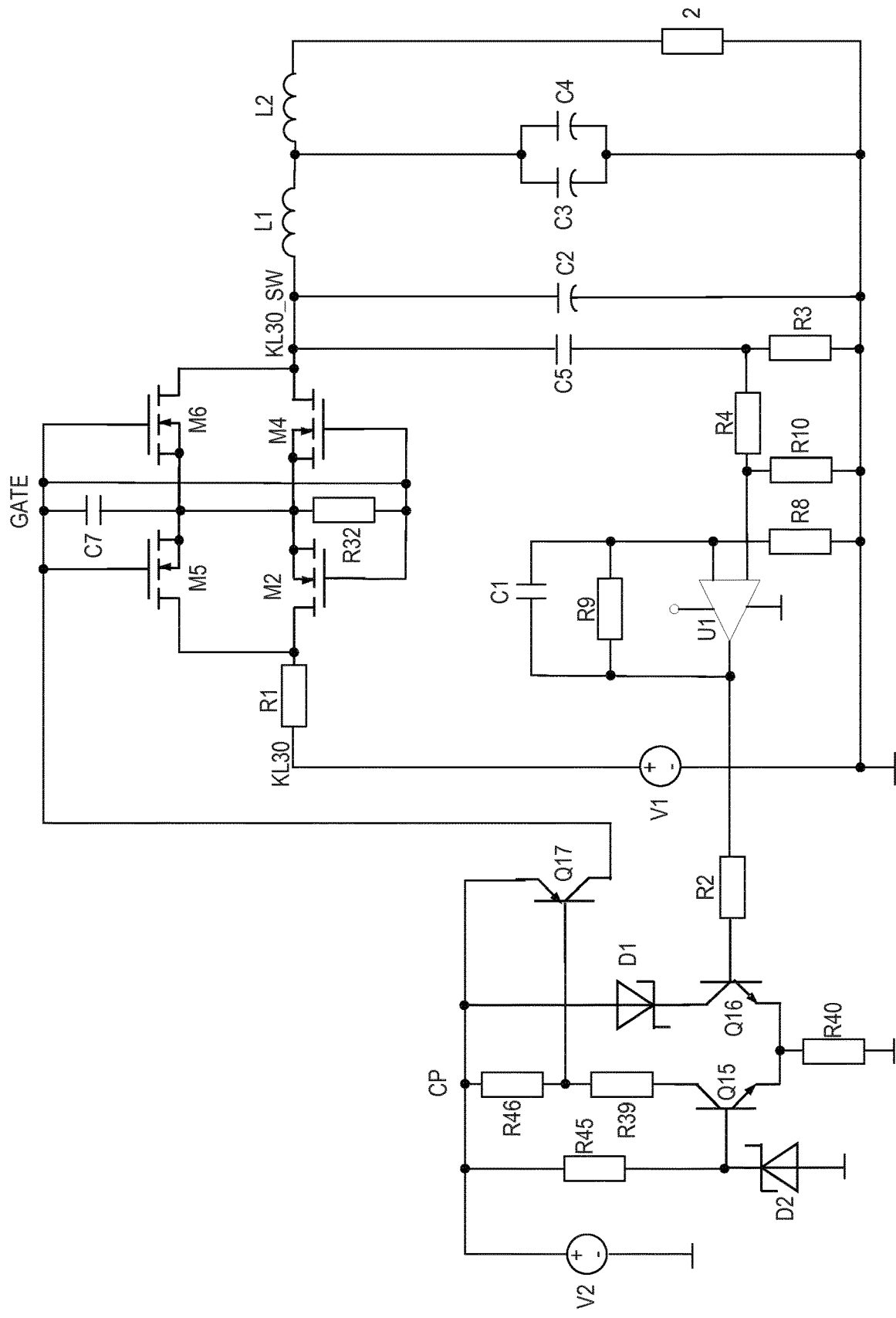
FIG. 5 illustrates a circuit for managing an inrush current.

The general function of the circuit for managing the inrush current is further described referring to FIG. 5, which illustrates a simulation circuit for managing the inrush current. The circuit includes capacitors C2, C3 and C4 at the input of the load 2. The input switch (S1 in FIGS. 1-4) in the circuit of FIG. 5 includes 4 MOSFETs M2, M4, M5, M6. A sense capacitor C5 and a sense resistance R3 are configured to determine the inrush current, as has been explained with regard to FIG. 4. The operational amplifier U1 corresponds to the first operational amplifier OpAmp1 of FIG. 4. The input switch M2, M4, M5, M6 is controlled by a further operational amplifier that is formed by transistors Q15 and Q16. The reference voltage of this further operational amplifier Q15, Q16 is provided by the Zener diode D2 that is coupled between one of the transistors Q15 and the terminal for negative supply potential GND.

If, e.g., R9=20 kΩ and R4=10Ω, then the gain of operational amplifier U1 will be U1=R9/R4=20 kΩ/10Ω=2000. The additional operational amplifier Q15, Q16 maintains the output of operational amplifier U1 equal to its reference, e.g. 3V. For an output voltage of 3V and a gain of 2000, the second input voltage for operational amplifier U1 may be calculated as 3V/2000=1.5 mV. A current through resistor R3, therefore, may be calculated as 1.5 mV/0.1 Ω=15 mA, if R3=0.1Ω. This current is the constant current which charges capacitor C5 to the input rail voltage. The time that is required to charge capacitor C5 at a constant current of 15 mA may be calculated as T=C*V/I and, therefore, if C5=4.7 µF, T=4.7 µF*13V/15 mA=4 ms. This means that it will take 4 ms to charge capacitor C5 at a constant current of 15 mA. The charging current, which corresponds to the inrush current, may generally be calculated as I=C*V/T. Therefore, if C2=C3=C4=560 µF, is =560 µF*3*13V/4 ms=5.5 A. The values in this example, however, are only exemplarily chosen. Any other suitable values may be chosen for the components within a circuit for managing the inrush current.

It can be seen from the results described above that even if supply rail (node KL30) rises sharply, the voltage at the electrolytic capacitors C3, C4, C5 (node KL30_SW) rises much more slowly. The time that is needed to fully charge the capacitors C3, C4, C5 (rise time at node KL30_SW) is about 4 ms, as has been calculated above. The charging current through resistor R1 is about 5.5 A. The output of operational amplifier U1 is maintained at about 3V. During the 4 ms that are needed to charge the capacitors C3, C4, C5, the MOSFETs M2, M4, M5, M6 are driven in their linear region and, therefore, limit the inrush current. In the current example this can be seen as a voltage of about 3V at the GATE of the MOSFETs M2, M4, M5, M6. When, after about 4 ms the capacitors C2, C3, C4 are fully charged, the output of the operational amplifier U1 reduces and the further operational amplifier Q15, Q16 increases its output voltage, trying to maintain the output of operational amplifier U1 equal to the reference voltage. This increases the gate-source voltage of the MOSFETs M2, M4, M5, M6 and turns the MOSFETs M2, M4, M5, M6 fully on. These results demonstrate that as a result the voltage between nodes KL30 and KL30_SW reduces slowly (while the MOSFETs M2, M4, M5, M6 are in linear mode) and finally reaches zero after about 4 ms when the capacitors C2, C3, C4 are fully charged (MOSFETs M2, M4, M5, M6 are fully on).

Figure 6:
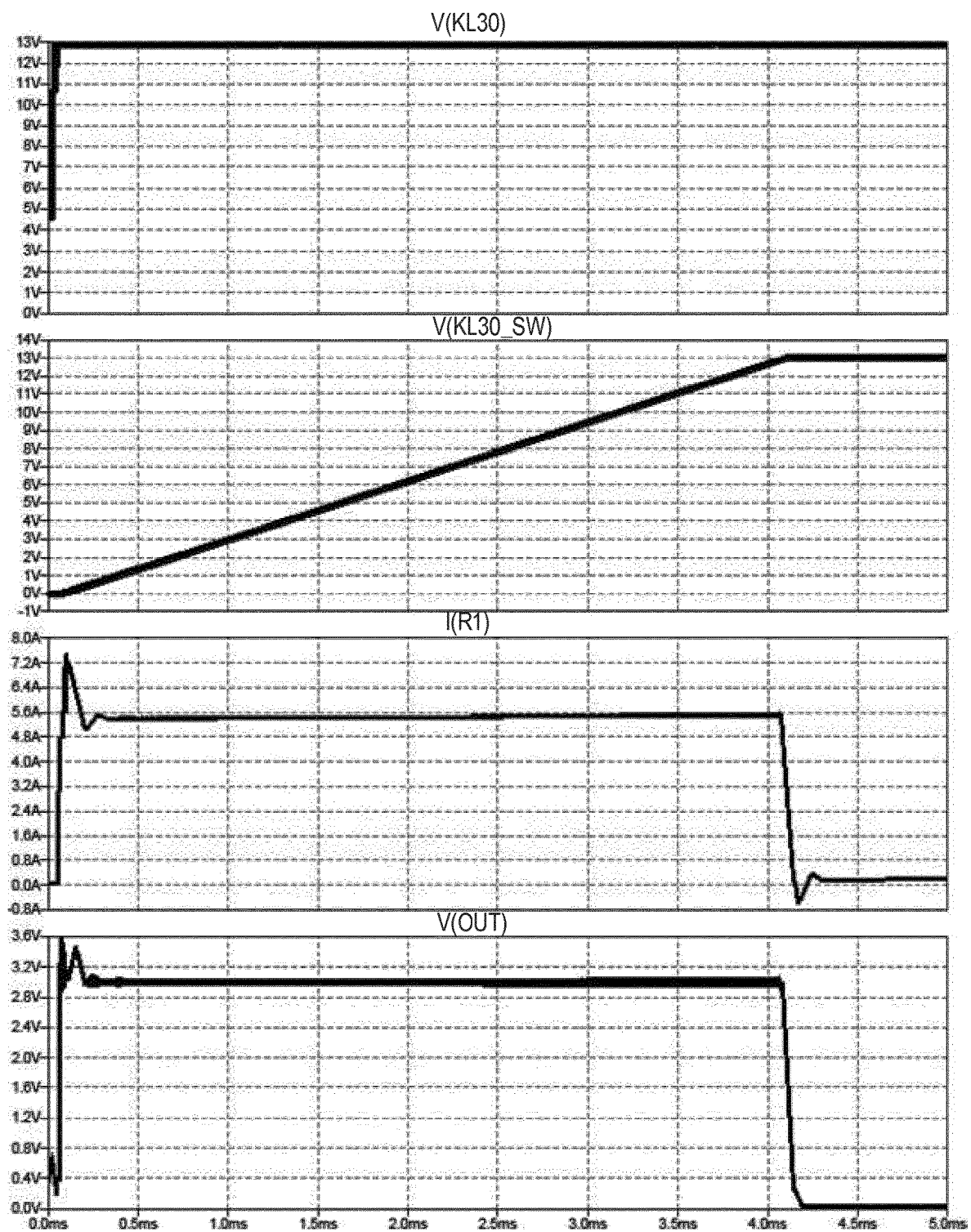
FIG. 6 illustrates in timing diagrams several voltages and currents within the circuit of FIG. 5.
Figure 7:
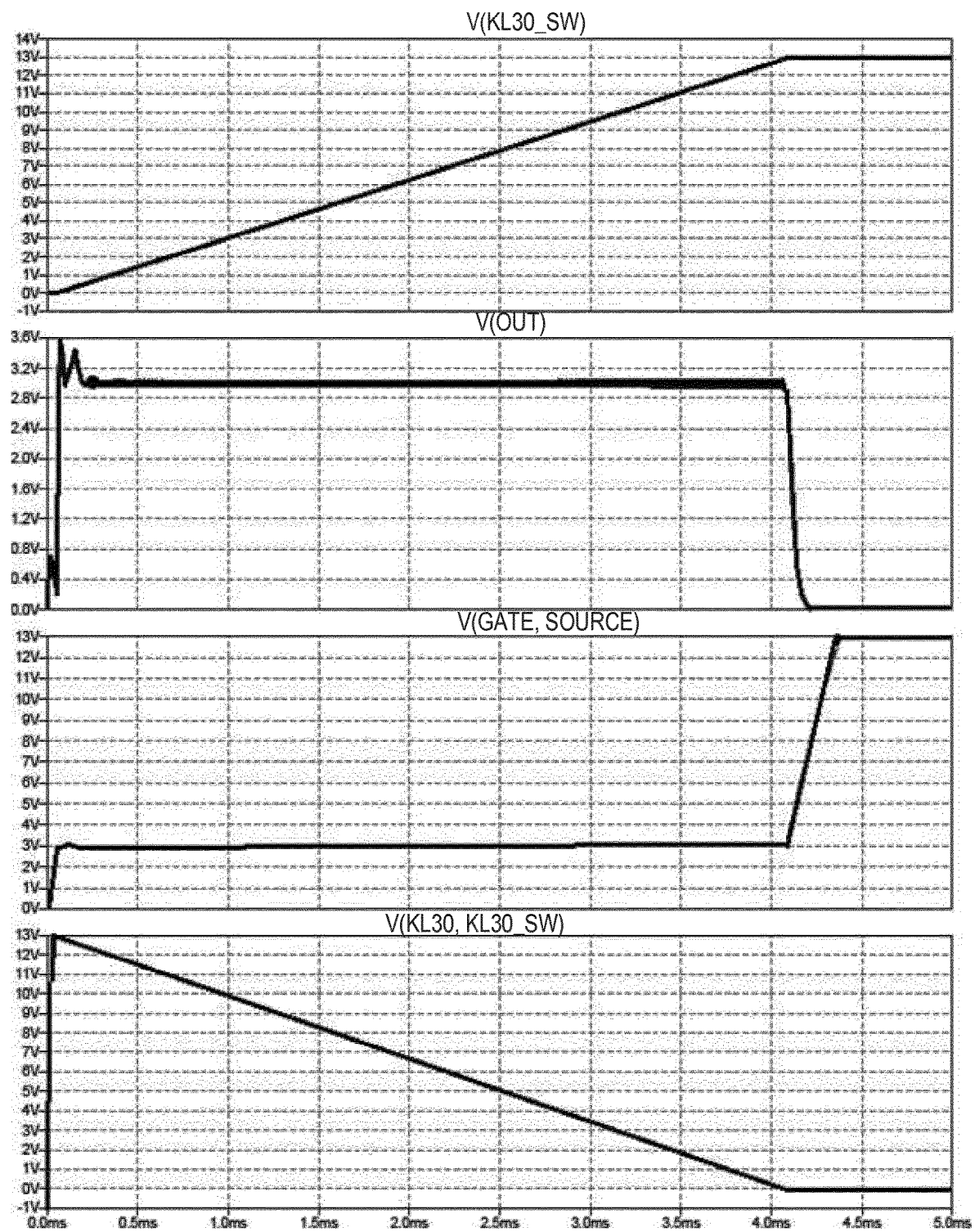
FIG. 7 illustrates in timing diagrams several further voltages within the circuit of FIG. 5.

This is further illustrated in the diagrams in FIGS. 6 and 7. The first diagram in FIG. 6 (topmost diagram) illustrates the voltage at node KL30 (V(KL30)) over time. As can be seen, the voltage V(KL30) immediately rises to a maximum voltage, which is about 13V in the circuit of FIG. 5. The voltage at node KL30_SW (second diagram from top), however, is regulated and rises linearly for about 4 ms until the capacitors C2, C3, C4 are fully charged. When the capacitors C2, C3, C4 are fully charged, the voltage V(KL30_SW) reaches its maximum value at about 13V. The current I(R1) at resistor R1 (third diagram from top) shows a peak shortly after the voltage at node KL30 rises to its maximum value and then stays constant at a value of about 5.6 A until the capacitors C2, C3, C4 are fully charged. When, after about 4 ms, the capacitors C2, C3, C4 are fully charged, the current I(R1) falls back to OA. The voltage V(OUT) at the output of operational amplifier U1, after a short peak, levels to a value of about 3.0V until the capacitors C2, C3, C4 are fully charged, when it falls back to zero.

FIG. 7 illustrates again the voltage V(KL30_SW) at node KL30_SW (topmost diagram) and the voltage V(OUT) at the output of operational amplifier U1, as described above (second diagram from top). The voltage V(GATE) at node V(GATE, SOURCE) between the gate terminal G and the source terminal S of the MOSFET (third diagram from top) rises to about 3V (level of Miller voltage of MOSFET) while the capacitors C2, C3, C4 are charged (linear mode of MOSFETs M2, M4, M5, M6). When the capacitors C2, C3, C4 are fully charged, the voltage V(GATE) at node GATE rises to its maximum value of about 13V. The voltage V(KL30, KL30_SW) (fourth diagram from top) between node KL30 and node KL30_SW in contrast, rises to a maximum value of about 13V directly after the voltage at KL30 rises to its maximum value and decreases to zero while the capacitors C2, C3, C4 are charged.

Figure 8:
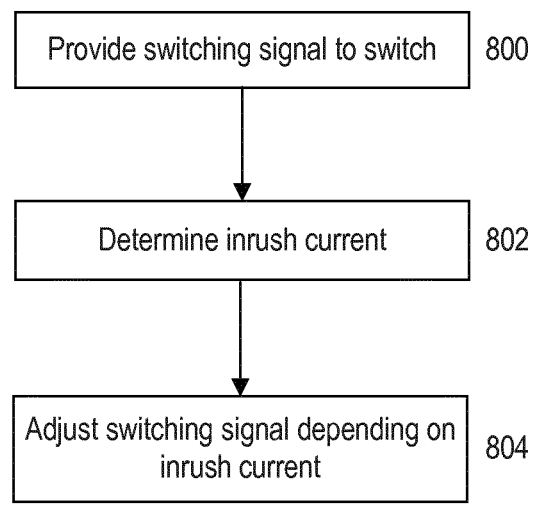
FIG. 8 illustrates in a flow chart a method for managing an inrush current.

FIG. 8 illustrates in a flow chart a method for managing an inrush current. A switching signal is provided to a switch (step 800). The switch is coupled between a load and a voltage source and is configured to connect the load to or disconnect the load from the voltage source. When the load is connected to the voltage source, a current is provided to the load and the circuit is in an active mode. When the switch is open and the load is not connected to the voltage source, no current is provided to the load and the circuit is in an inactive or standby-mode. When the switch is closed, an inrush current through the switch arises. This inrush current is determined (step 802). Depending on the determined inrush current, the switching signal is adjusted (step 804). In this way, the current through the switch can be controlled and an excessive inrush current can be prevented.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A circuit for managing an inrush current of a load, wherein the load is coupled between a voltage source and a terminal for a negative supply potential, the circuit comprising:
   a switch coupled between the voltage source and the load, and configured to connect the load to or disconnect the load from the voltage source;
   at least one load capacitor coupled in parallel to the load between the switch and the terminal for negative supply potential; and
   a control unit,
   including a sense unit and a switching unit, wherein:
   the sense unit is configured to determine the inrush current when the switch is closed to connect the load to the voltage source, and
   the switching unit is configured to control the switching of the switch depending on the inrush current,
   wherein the sense unit includes a sense resistor, a sense capacitor, and a first operational amplifier,
   wherein the sense resistor and the sense capacitor are coupled in series between the switch and the terminal for the negative supply potential, in parallel to the load, wherein the first operational amplifier is configured to determine a current through the sense resistor and to provide a sense voltage; and wherein a first input of the first operational amplifier shares a common node directly with the sense resistor and the terminal for the negative supply potential.

2. The circuit of claim 1, wherein the switch comprises at least one MOSFET.

3. The circuit of claim 1,
wherein the current through the sense resistor depends on the inrush current and the sense voltage depends on the current through the sense resistor.

4. The circuit of claim 3, wherein the switching unit includes a second operational amplifier which is configured to provide a switching voltage to the switch to activate the switch based at least on the sense voltage from the first operational amplifier.

5. The circuit of claim 4, wherein the switching voltage depends on a difference between the sense voltage provided by the first operational amplifier and a reference voltage.

6. A method for managing an inrush current of a load, wherein the load is coupled between a voltage source and a terminal for a negative supply potential, the method comprising:
providing a switching signal to a switch that is coupled between the voltage source and the load and wherein the switch is configured to connect the load to or disconnect the load from the voltage source;
determining an inrush current through the switch, via a sense unit; and
adjusting the switching signal depending on the determined inrush current,
wherein the sense unit includes a sense resistor, a sense capacitor, and a first operational amplifier,
wherein the sense resistor and the sense capacitor are coupled in series between the switch and the terminal for the negative supply potential, in parallel to the land,
wherein the first operational amplifier is configured to determine a current through the sense resistor and to provide a sense voltage; and
wherein a first input of the first operational amplifier shares a common node directly with the sense resistor and the terminal for the negative supply potential.

7. The method of claim 6, wherein the switch includes at least one MOSFET having a gate terminal, a drain terminal and a source terminal, and wherein the switching signal is configured to regulate a gate-source voltage of the at least one MOSFET.

8. The method of claim 7, wherein at least one load capacitance is coupled in parallel to the load between the switch and the terminal for negative supply potential, wherein the at least one load capacitance is charged when the switch closes and connects the load and the at least one load capacitance to the voltage source, and wherein the method further comprises:
operating the at least one MOSFET in a linear region thereof from a point in time when the switch closes, until the at least one load capacitance is fully charged.

9. The method of claim 6 further comprising providing a switching voltage, via a second operation amplifier, to the switch to activate the switch based at least on the sense voltage from the first operational amplifier.

10. A circuit for managing an inrush current of a load, the circuit comprising:
a switch coupled between a voltage source and the load, and the switch being configured to connect the load to or disconnect the load from the voltage source;
at least one load capacitor coupled in parallel to the load between the switch and a negative supply potential; and
a control unit including a sense unit and a switching unit, wherein:
the sense unit is configured to determine the inrush current when the switch is closed to connect the load to the voltage source,
the switching unit is configured to control the switching of the switch based on the inrush current,
wherein the sense unit includes a sense resistor, a sense capacitor, and a first operational amplifier,
wherein the sense resistor and the sense capacitor are coupled in series between the switch and a terminal for the negative supply potential, in parallel to the load,
wherein the first operational amplifier is configured to determine a current through the sense resistor and to provide a sense voltage; and
wherein a first input of the first operational amplifier shares a common node directly with the sense resistor and the terminal for the negative supply potential.

11. The circuit of claim 10, wherein the switch comprises at least one MOSFET.

12. The circuit of claim 10,
wherein the current through the sense resistor depends on the inrush current and the sense voltage depends on the current through the sense resistor.

13. The circuit of claim 12, wherein the switching unit includes a second operational amplifier that is configured to provide a switching voltage to the switch to activate the switch based at least on the sense voltage from the first operational amplifier.

14. The circuit of claim 13, wherein the switching voltage depends on a difference between the sense voltage provided by the first operational amplifier and a reference voltage.

* * * * *